(12) United States Patent
Kamoshida et al.

(10) Patent No.: US 9,021,913 B2
(45) Date of Patent: May 5, 2015

(54) SHIFT DEVICE FOR A TRANSMISSION OF A MOTOR VEHICLE

(75) Inventors: Toru Kamoshida, Wako (JP); Hiroyuki Kuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 13/588,246

(22) Filed: Aug. 17, 2012

(65) Prior Publication Data

US 2013/0047768 A1 Feb. 28, 2013

(30) Foreign Application Priority Data

Aug. 29, 2011 (JP) .................................. 2011-186512

(51) Int. Cl.
| B60K 20/00 | (2006.01) |
| F16H 59/04 | (2006.01) |
| F16H 59/08 | (2006.01) |
| F16H 61/18 | (2006.01) |
| F16H 59/44 | (2006.01) |

(52) U.S. Cl.
CPC .............. F16H 59/08 (2013.01); *Y10T 74/2014* (2015.01); F16H 61/18 (2013.01); *F16H 2059/081* (2013.01); *F16H 59/44* (2013.01)

(58) Field of Classification Search
CPC .............. F16H 59/02; F16H 2059/081; F16H 2061/247; B60K 37/03; B60K 2350/102; G05G 1/08
USPC ....................... 74/10.41, 473.1, 473.12, 473.3
See application file for complete search history.

(56) References Cited

U.S. PATENT DOCUMENTS

| 5,156,243 | A | * | 10/1992 | Aoki et al. ..................... 192/218 |
| 6,564,661 | B2 | * | 5/2003 | DeJonge ......................... 74/335 |
| 7,571,662 | B2 | * | 8/2009 | Pickering et al. ............ 74/473.3 |
| 7,971,498 | B2 | | 7/2011 | Meyer et al. |
| 8,413,536 | B2 | * | 4/2013 | Giefer et al. ................. 74/473.3 |
| 8,548,696 | B2 | * | 10/2013 | Jerger et al. ..................... 701/51 |
| 2006/0037424 | A1 | * | 2/2006 | Pickering et al. ............ 74/473.3 |
| 2007/0261509 | A1 | * | 11/2007 | Meyer et al. ..................... 74/504 |

FOREIGN PATENT DOCUMENTS

| DE | 10242015 A1 | 3/2004 |
| DE | 60218392 T2 | 11/2007 |

(Continued)

OTHER PUBLICATIONS

Japanese Office Action dated Jun. 6, 2013, three pages.

(Continued)

*Primary Examiner* — Justin Krause
(74) *Attorney, Agent, or Firm* — Rankin, Hill & Clark LLP

(57) ABSTRACT

In a shift by wire transmission, a control unit limits the shift position (P, R, N, D, L) to be changed beyond a prescribed shift position depending on an initial shift position and an amount of the movement of the shift member in a single shifting operation. Thereby, even when the shift member is excessively advanced or otherwise improperly advanced, the actually selected shift position can be suitably selected so that an undesired change of the shift position can be avoided. The control unit may also limit the selected shift position to be changed beyond a prescribed shift position depending on a traveling speed of the vehicle so that an improper change in the shift position due to vehicle speed constraints can be avoided by using a simple structure.

19 Claims, 18 Drawing Sheets

(56) References Cited

FOREIGN PATENT DOCUMENTS

| | | |
|---|---|---|
| DE | 102008011305 A1 | 9/2008 |
| DE | 102010053757 A1 | 6/2012 |
| JP | H3-6162 U | 1/1991 |
| JP | 2001-124197 | 5/2001 |
| JP | 2006-57695 | 3/2006 |
| JP | 2008-511063 | 4/2008 |
| JP | 2010-090925 | 4/2010 |

OTHER PUBLICATIONS

German Search Report and English Translation, dated Feb. 18, 2013, 11 pages.

\* cited by examiner

SHIFT DEVICE FOR A TRANSMISSION OF A MOTOR VEHICLE

FIELD OF THE INVENTION

The present invention relates to a shift device for a transmission of a motor vehicle, and in particular to a shift device using a shift member that can be advanced in either direction in an endless manner.

BACKGROUND ART

The shift device for the transmission of a motor vehicle is provided with a shift lever which is typically located in the center console. When there is no center console or the center console does not provide a space for installing the shift lever, the shift lever may also be provided adjacent to the steering column or on the instrument panel.

In a typical automatic transmission, the shift positions are arranged in the order of the P (parking) position, the R (reverse) position, the N (neutral) position and the D (drive position) in that other. Oftentimes, a special forward travel position is provided in addition to the D position, and is typically located next to the drive position on the other side of the N position. Such an additional forward travel position is called as the S (sport mode) position, the 2 (second) position and the L (low speed) position depending on the purpose thereof. In the case of an electric vehicle or a hybrid vehicle, the additional forward travel position may consist of the B (regenerative braking) position. As the special forward travel position is designed for a special purpose such as increasing the engine brake and improving the response of the vehicle, it is selected only under special circumstances. As the special forward travel position is located next to the D position, it is possible that the vehicle operator inadvertently selects the special forward travel position, and it may irritate the vehicle operator.

The conventional shift device for an automatic transmission is provided with an interlock that prevents an improper shifting to be made under certain conditions. For instance, the shift position cannot be moved from the P position unless the brake pedal is depressed. The shift position cannot be shifted from the N position unless a button fitted to the shift level is depressed.

The shift lever was traditionally connected to the automatic transmission via a mechanical link. In recent years, various proposals have been made to detect the displacement of the shift lever with an electric sensor, and transmit the detection signal of the electric sensor to the automatic transmission via a control unit. Such an arrangement is known as the shift by wire (SBW) system. In the shift device illustrated in FIGS. 9 and 10 of U.S. Pat. No. 7,971,498, a shift knob for rotational movement is surrounded by a C-shaped stopper member that restricts the rotation of the shift knob to a range defined by the gap in the stopper member. This range can be varied by turning the C-shaped stopper member around the shift knob.

JP 2010-090925A discloses a SBW shift device using a shift lever of a momentary switch type. According to this shift device, the shift lever is configured to return to the N position upon release of the shift lever. The desired shift change is effected by moving the shift lever away from the N position in the corresponding direction, and releasing the shift lever. In this shift device, to avoid the inadvertent shifting from the D position to the R position even though the vehicle operator intends to change the shift position to the N position, the time period required for recognizing the completion of the shift change is varied depending on the kind of the shift change.

In the invention disclosed in U.S. Pat. No. 7,971,498, the selected shift position can be determined independently from the angular position of the shift knob while the rotational range of the shift knob is variably restricted by the stopper member. According to this invention, even when the shift knob is placed at a position other than the P position when deactivating the vehicle, the P position may be automatically restored when restarting the engine. However, no arrangement is made for preventing an inadvertent selection of a shift position or a shift interlock under special conditions.

The invention disclosed in JP 2010-090925A is applicable only to a momentary switch type shift device, and not to a shift device using an endlessly rotatable shift knob.

BRIEF SUMMARY OF THE INVENTION

In view of such problems of the prior art, a primary object of the present invention is to provide a shift device for a transmission of a motor vehicle which is provided with a shift knob that can be rotated or otherwise advanced in either direction in an endless manner.

A second object of the present invention is to provide a shift device for a transmission of a motor vehicle that can be shifted by a shift knob configured to be advanced in either direction in an endless manner and provided with an arrangement for preventing an inadvertent selection of a shift position not intended by the vehicle operator.

A third object of the present invention is to provide a shift device for a transmission of a motor vehicle that can be shifted by a shift knob configured to be advanced in either direction in an endless manner and provided with an arrangement for preventing an undesired selection of a shift position under a prescribed operating condition of the vehicle in a reliable manner by using a highly simple structure.

To achieve such objects, the present invention provides a speed shift device for a transmission of a motor vehicle, comprising: a shift member that can be manually advanced selectively in a first direction and a second direction in an endless manner; a movement detector that detects a movement of the shift member; a control unit for selecting a shift position of the transmission from a plurality of shift positions in a prescribed order according to a detection signal of the movement detector; and an indicator that indicates the selected shift position; wherein the control unit is configured to cause the selected shift position to be changed in the prescribed order in correspondence to a displacement of the shift member in each single shifting operation under normal condition, and to limit the selected shift position to be changed beyond a prescribed shift position depending on an initial shift position and an amount of the movement of the shift member in a single shifting operation.

According to this arrangement, even when the shift member is excessively advanced or otherwise improperly advanced, the actually selected shift position can be suitably selected depending on the initial shift position and the amount of the movement of the shift member so that an undesired change of the shift position can be avoided. Furthermore, such an arrangement can be realized by an electric circuit or without using any complex mechanical arrangements.

Typically, the shift member comprises a shift knob that can be rotated in either direction in an endless manner. In such a case, the shift member may further comprise a detent mechanism that retains the shift knob resiliently at each of the shift positions. Thereby, the user is allowed to manipulate the shift member both accurately and comfortably. The single shifting operation can be determined as a continuous movement of the shift member that does not include a pause of more than a prescribed time period.

According to an alternate embodiment of the present invention, the shift member consists of a momentary switch type shift member that can be moved in either direction from a neutral position and configured to be returned to the neutral position when released, and the movement detector is configured to detect the movement of the shift member according to a time duration of the displacement of the shift member from the neutral direction in each given direction. Alternately, the movement detector may detect the movement of the shift member according to a number of prescribed displacements of the shift member from the neutral direction in each given direction.

According to a basic aspect of the present invention, the shift positions include a non-forward travel position, a D (drive) position for a normal forward travel and an additional forward travel position for a special purpose, such as an L position, arranged in that order in the first direction, and the control unit is configured to limit the change in the shift position from the non-forward travel position in a single shifting operation in the first direction to the D position without regard to the displacement of the shift member.

Therefore, when the vehicle operator starts off the vehicle, even if the shift member is advanced from the non-forward travel position such as a P position excessively beyond the D position, the shift position is limited to the D position, instead of selecting the L position. Therefore, the vehicle operator is not required to advance the shift member exactly to the D position, and is not required to turn back the shift member if the additional forward travel position such as the L position even when the shift member is excessively advanced. Thereby, the vehicle operator is allowed to operate the shift member in a comfortable manner. The non-forward travel position may include at least one of a P (park) position, a R (reverse) position and a N (neutral) position.

According to another aspect of the present invention, the non-forward travel position comprises a P (park) position, and the control unit is configured to prevent the change in the shift position from the P position in a single shifting operation in the second direction without regard to the displacement of the shift member in the second direction.

According to yet another aspect of the present invention, the control unit is configured to limit the selected shift positions to be changed beyond a prescribed shift position additionally depending on a state of a brake of the vehicle. For instance, the shift device prevents the changing of the shift position from the P position unless the brake pedal is depressed.

According to a particularly preferred embodiment of the present invention, the control unit is configured to limit the selected shift position to be changed beyond a prescribed shift position additionally depending on a traveling speed of the vehicle. Typically, the non-forward travel position includes a P (park) position, a R (reverse) position and a N (neutral) position arranged in that order in the first direction.

For instance, the control unit may be configured to prevent the change in the shift position from the R position in a single shifting operation by an advancing of the shift member by one or more stages in the second direction when the vehicle is traveling at more than a prescribed speed in either direction (Vth1). The changing the shift position to the P position when the vehicle is in motion is damaging to the transmission. Therefore, it is advantageous that the changing of the shift position from the R position to the P position is prevented when the vehicle is not substantially stationary.

In another example, the control unit is configured to limit the change in the shift position from the R position to the N position in a single shifting operation by an advancing of the shift member by two or more stages in the first direction when the vehicle is traveling rearward at more than a prescribed speed (Vth3). Changing the shift position from the R position to the D position while the vehicle is traveling rearward is damaging to the transmission. Therefore, it is advantageous to limit the change of the shift position from the R position to the N position or short of the D position.

In yet another example, the control unit is configured to limit the change in the shift position from the N position to the R position in a single shifting operation by an advancing of the shift member by two or more stages in the second direction when the vehicle is traveling at more than a prescribed speed (Vth1) in either direction but not more than a second prescribed speed (Vth2) greater in value than the first prescribed speed. The changing the shift position to the P position when the vehicle is in motion is damaging to the transmission. However, if the vehicle is traveling rearward or not traveling forward at high speed, the changing the shift position to the P position may not be permissible but the changing the shift position to the R position is permissible. Therefore, it is advantageous that the changing of the shift position from the N position to the P position is prevented but the changing of the shift position from the N position to the R position is permitted when the traveling speed of the vehicle is appropriate.

In yet another example, the control unit is configured to prevent the change in the shift position from the N position in a single shifting operation by an advancing of the shift member by one stage in the second direction when the vehicle is traveling forward at more than a prescribed speed (Vth2). When the vehicle is traveling forward at a relatively high speed, the changing of the shift position to either the R position or the P position should not be permitted, and it is advantageous to prevent the shift position from the N position in the second direction.

In yet another example, the control unit is configured to prevent the change in the shift position from the N position in a single shifting operation by an advancing of one or more stages in the first direction when the vehicle is traveling rearward at more than a prescribed speed (Vth3). When vehicle is traveling rearward at some speed, it is damaging to the transmission to change the shift position to the D position. It is therefore advantageous to prevent the change of the shift position from the N position in the first direction.

In yet another example, the control unit is configured to limit the change in the shift position from the D position to the N position in a single shifting operation by an advancing of the shift member by two stages in the second direction when the vehicle is traveling forward at more than a prescribed speed (Vth2). When the vehicle is traveling forward at some speed, it may be damaging to the transmission to change the shift position to the R position. It is therefore advantageous to limit the change of the shift position from the D position in the second direction to the N position.

In yet another example, the control unit is configured to limit the change in the shift position from the D position to the N position in a single shifting operation by an advancing of the shift member by three or more stages in the second direction when the vehicle is traveling at more than a prescribed speed (Vth1) in either direction. When the vehicle is traveling in either direction at some speed, it may be damaging to the transmission to change the shift position to the PR position. It is therefore advantageous to limit the change of the shift position from the D position in the second direction to the N position.

BRIEF DESCRIPTION OF THE SEVERAL VIEWS OF DRAWINGS

Now the present invention is described in the following with reference to the appended drawings, in which.

DETAILED DESCRIPTION OF THE INVENTION

Figure 1:
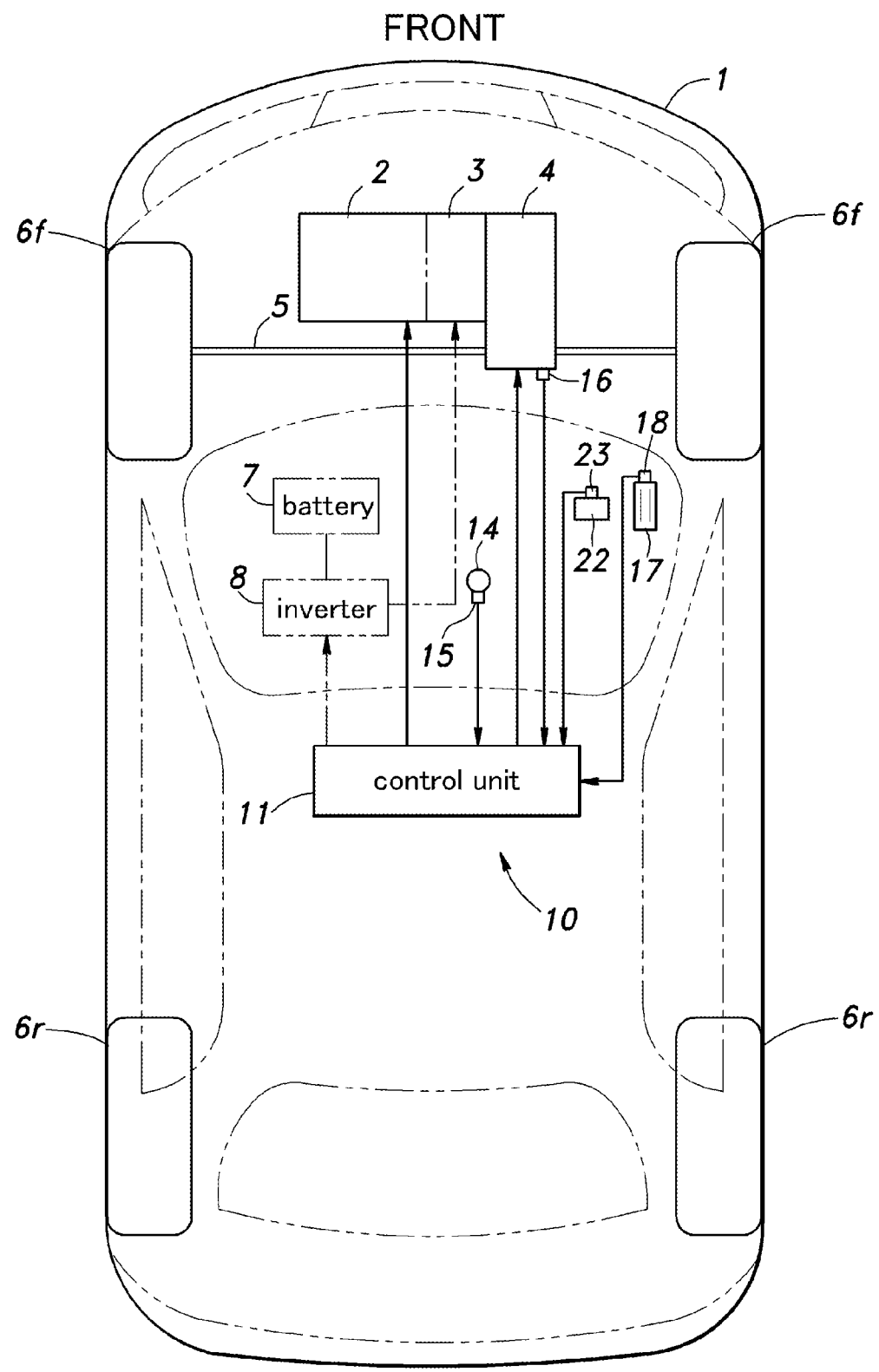
FIG. 1 is a block diagram showing an overall functional structure of a motor vehicle to which the present invention is applied.

Referring to FIG. 1, a motor vehicle 1 embodying the present invention is provided with an internal combustion engine 2 as a power source, and the output of the engine 2 is transmitted to driven road wheels via a front axle 5 via an automatic transmission 4. The driven road wheels of the motor vehicle 1 of the illustrated embodiment consist of front wheels 6f, but the present invention is equally applicable to rear wheel drive vehicles where rear wheels 6r consist of driven road wheels and four wheel drive vehicles where both the front and rear wheels 6 consist of driven road wheels. The automatic transmission 4 of the illustrated embodiment consists of a multi gear stage automatic transmission system having four forward drive stages and one reverse drive stage, but may also consist of a continuously variable transmission (CVT).

The motor vehicle 1 may also consist of an electric vehicle fitted with an electric motor instead of an internal combustion engine or a hybrid vehicle fitted with an electric motor in combination with an internal combustion engine. In such a case, the electric motor may consist of a motor generator 3 that receives a supply of electric power from a battery 7 and charges the battery 7 depending on the operating condition of the vehicle under the control of an inverter 8. For instance, when the vehicle is decelerating, the motor generator 3 provides a braking force to the vehicle, and recovers the energy from the deceleration of the vehicle.

The vehicle 1 includes a control unit 11 incorporated with a microcomputer, ROM, RAM, peripheral circuits, input/output interfaces and various drivers, a shift knob 14 for manually selecting the gear range of the transmission, a rotary encoder 15 for detecting the displacement (angular displacement $\theta s$) of the shift knob 14, a vehicle speed sensor 16 for detecting the traveling speed of the vehicle 1, an accelerator pedal sensor 18 for detecting the displacement $\theta a$ of the accelerator pedal 17 and a brake pedal sensor 23 for detecting the depression of the brake pedal 22 or the engagement of the brake device. The shift device 10 of the present invention is essentially constituted by the control unit 11, the shift knob 14, the rotary encoder 15 and the vehicle speed sensor 16.

The control unit 11 performs a shift control whereby the gear range of the transmission 4 is selected according to the operation of the shift knob 14 and the gears of the transmission 4 are changed according to the selected gear range and the operating condition of the engine, in addition to controlling the operation of the engine 2. The shifting of the gears is performed via the control of the shift solenoid valves provided in a hydraulic circuit of the transmission. When the vehicle consists of an electric vehicle or a hybrid vehicle, the control unit 11 controls the driving and regenerating action of the motor generator 3 as well.

Figure 2:
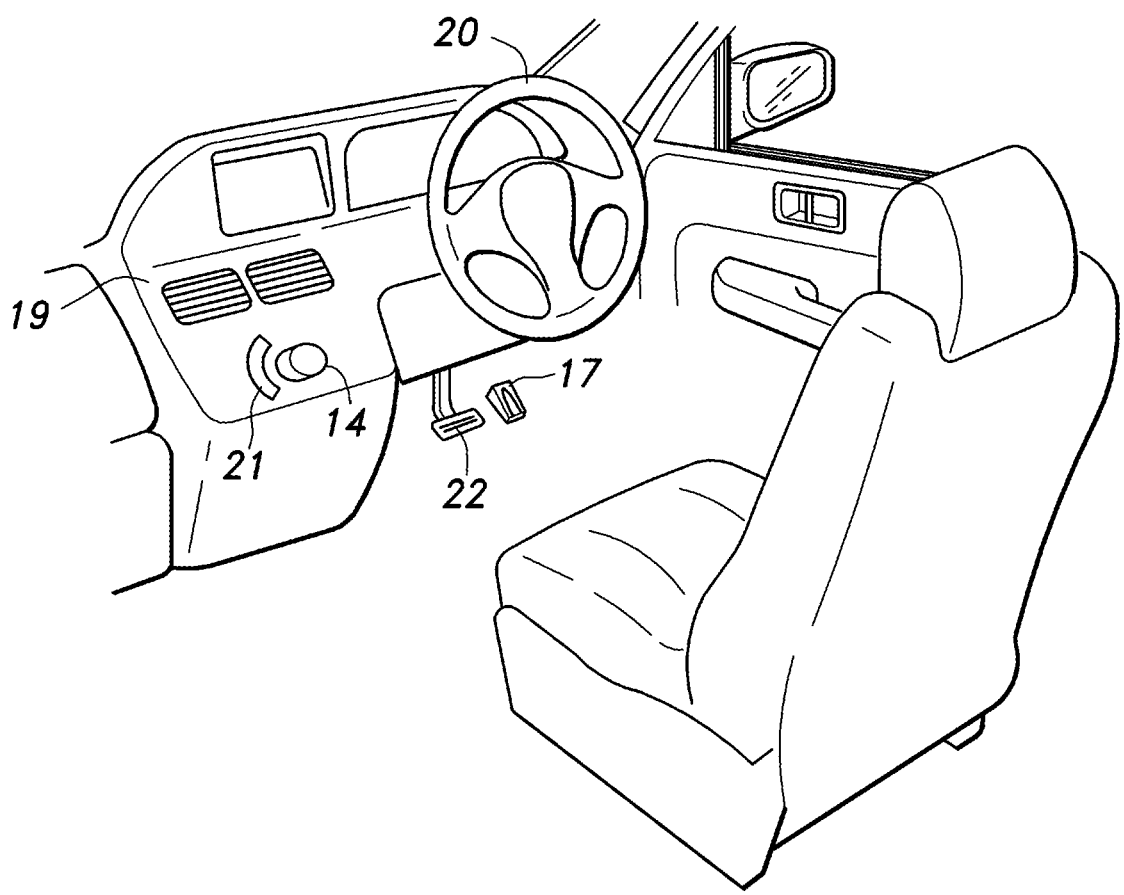
FIG. 2 is a perspective view of a part of a passenger compartment of the vehicle surrounding a vehicle operator's seat.
Figure 3:
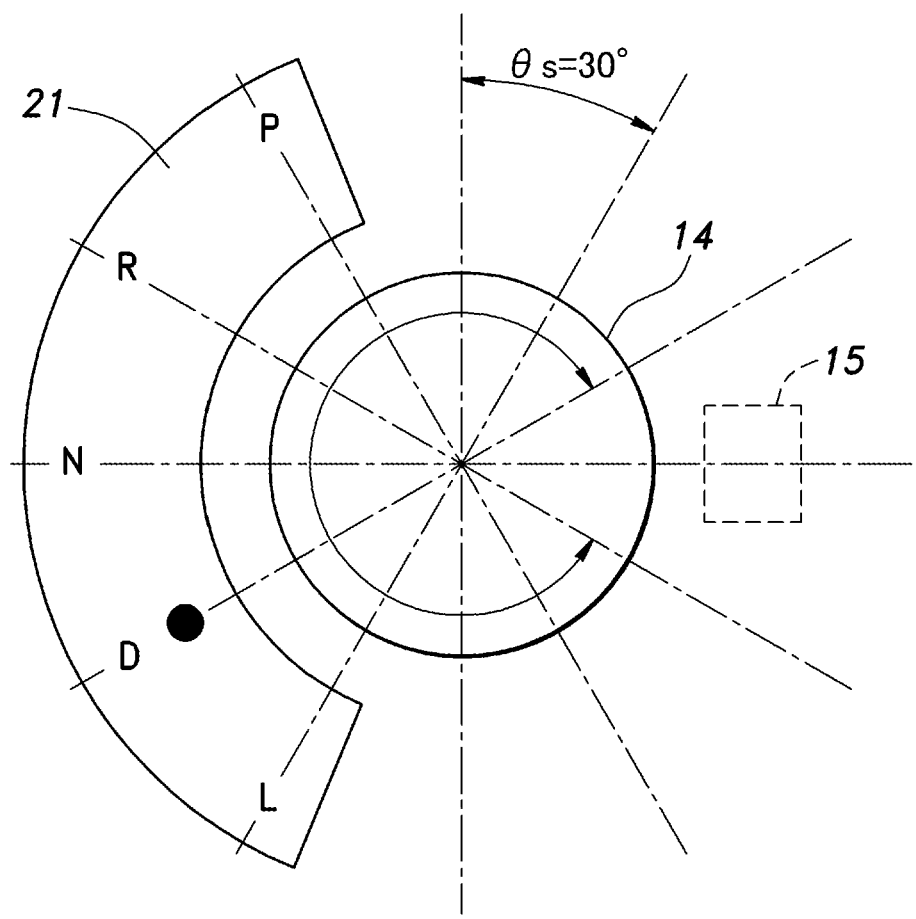
FIG. 3 is a diagram showing a shift knob and a display panel provided around the shift knob.

As shown in FIGS. 2 and 3, the shift knob 14 is disk-shaped, and is located in a lower left part of an instrument panel 19 of the vehicle 1 with respect to a steering wheel 20. This part of the instrument panel 19 may be more protruded than the remaining part of the instrument panel 19 so that the vehicle operator can comfortably reach the shift knob 14. The provision of the shift knob 14 on the instrument panel 19 eliminates the need for a center console so that the inner space of the passenger compartment can be used in an efficient manner. The positioning of the shift knob 14 is not essential for the present invention, and may also be placed in a center console or any other convenient place without departing from the spirit of the present invention.

The shift knob 14 is configured to be turned endlessly in either direction, and provides detent action at every 30 degrees of rotation. Therefore, the vehicle operator is enabled to sense each 30 degrees of rotation by tactile sensation, and the shift knob 14 is held at any of the angular positions separated by the 30 degree angle while prevented from being held at any intermediate position. Such a detent action can be achieved by using any known detent mechanism such as the one disclosed in U.S. Pat. No. 7,971,498.

As shown in FIG. 3, a display panel 21 is provided in a part of the instrument panel 19 surrounding the shift knob 14, and includes markings for the shift positions P, R, N, D and L in that order in counter-clockwise direction. The display panel 21 is provided with an internal lighting arrangement such that any selected one of the shift positions is illuminated. The arrangement of the shift positions is not limited by the illustrated embodiment, but may be selected as desired without departing from the spirit of the present invention. For instance, these shift positions may be arranged in clockwise direction, a S position and/or a 2 position may be provided in succession to the L position or instead of the L position. The B position may also be provided instead of the L position.

The rotary encoder 15 is provided on the back side of the instrument panel 19, and is configured to detect the angular displacement $\theta s$ of the shift knob 14. The detection signal of the rotary encoder 15 is forwarded to the control unit 11, and is used for the shift control of the transmission 4.

Figure 4:
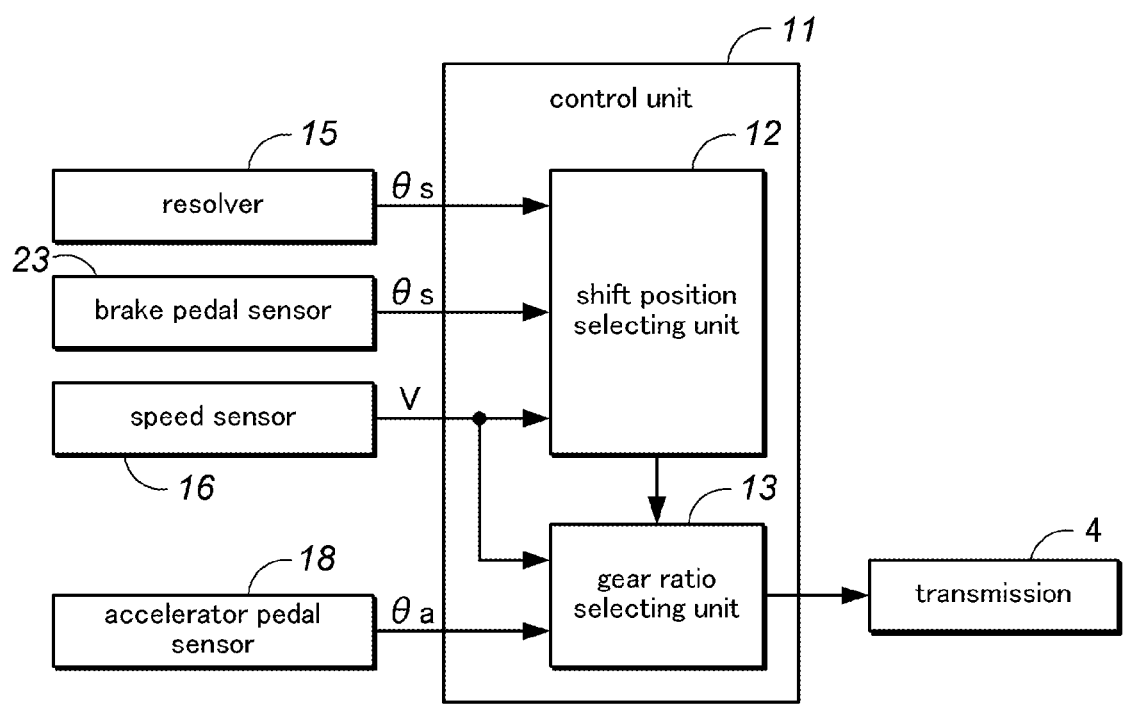
FIG. 4 is a functional block diagram of a speed shift device embodying the present invention.

As shown in FIG. 4, the control unit 11 includes a shift position selecting unit 12 and a gear ratio selecting unit 13. The shift position selecting unit 12 changes the current shift position to a new shift position depending on the angular displacement $\theta s$ and the direction of the angular movement. More specifically, normally, every time the shift knob 14 is turned by a prescribed angle (30 degrees in the illustrated embodiment), the control unit 11 changes the shift position by one stage. For instance, suppose that the current shift position is the P position, and the shift knob 14 is tuned in counter clockwise direction by 90 degrees. The control unit 11 changes the shift position by three stages, and sets the shift position to the D position. When turning the shift knob 14, the shift knob 14 may slightly overshoot the intended shift position, and is turned back to the D position. The detent mechanism of the shift knob 14 then finally settles the shift position at D. In such a case, it can be said that the shift knob 14 was turned from the initial position to the D position. At any event, the angular displacement of any shift operation is determined as that between the initial angular position and the final angular position as a result of a single shifting operation.

However, such an arrangement may create a certain inconvenience. The vehicle operator when starting the vehicle turns the shift knob in counter clockwise direction, and it is highly possible that the shift knob is turned by more than 90 degrees. In such a case, the L position is inadvertently selected, and the vehicle operator is required to turn back the shift knob in clockwise direction by 30 degrees. Such an occurrence may cause an irritation to the vehicle operator.

Based on such a consideration, according to the illustrated embodiment, a certain arrangement is made such that the shift knob is turned in counter-clockwise direction by 90 degrees in effect even when the shift knob is turned in counter-clockwise direction by well more than 90 degrees without a pause. According to the particular arrangement of the illustrated embodiment, when an angular displacement of 90 degrees is made from the P position without a pause, the D position is selected. Also when an angular displacement of 120 degrees or more is made without a pause, the D position is still selected. Thereby, the vehicle is enabled to operate the shift knob 14 without experiencing the irritation mentioned above.

"Without a pause" in this case may mean that the shift knob was turned by a certain angle without being held stationary for more than a prescribed time period such as 0.2 seconds. Turning of the shift knob without a pause can be regarded as a single shifting operation. If there is a pause of more than 0.2 seconds, the process of turning the shift knob is considered as being completed, and any subsequent rotation of the shift knob is considered as a second shifting operation which is separated from the first shifting operation by the pause. For instance, if the shift knob is turned in one direction and then in the opposite direction without a pause of more than 0.2 seconds during the whole process, it is no different from turning the shift knob directly from the initial position to the final position without reversing the direction of turning the knob.

The shift position selecting unit 12 is provided with a counter that is incremented every time the shift knob passes a shift position according to the detection signal from the rotary encoder 15 so that the angular displacement of the shift knob 14 in each shifting operation can be determined from the count value C of the counter provided in the shift position selecting unit 12. More specifically, the initial count value C is zero when the shift position is at P, and the count value C is incremented by +1 when the shift knob 14 is turned in counter-clockwise direction by 30 degrees. When the shift knob 14 is turned in counter-clockwise direction by 90 degrees in a single shifting operation, the count value C is incremented by +3. When the shift knob 14 is turned in clockwise direction by 30 degrees in a single shifting operation, the count value C is incremented by −1, or decremented by +1.

In this manner, the shift position selecting unit 12 keeps track of the shift actions according to the count value C. For instance, when the shift knob is turned from the P position in counter-clockwise direction by 30 degrees, and the count value C=+1 is registered, the shift position selecting unit 12 sets the R range. Likewise, when the shift knob is turned from the P position in counter-clockwise direction by 60 degrees and 90 degrees, and the count value C=+2 and +3 are registered, shift position selecting unit 12 sets the N and D ranges, respectively. The shift device is configured such that the P position is selected at the time of vehicle start up.

The gear ratio selecting unit 13 selects the gear ratio of the transmission 4 according to the shift position selected by the shift position selecting unit 12 by selectively activating corresponding solenoid valves of the hydraulic circuit not shown in the drawings. More specifically, when the P position or the N position is selected, the gear ratio selecting unit 13 disconnects the path of the power transmission in the transmission 4 in a per se known manner. When the R position is selected, the reverse gear is engaged. When the D position is selected, the gears are shifted according to the depression θa of the accelerator 17 detected by the accelerator pedal sensor 18 and the traveling speed V of the vehicle by using a suitable map. When the L position is selected, the range of the gear ratios is restricted such that an increased engine brake may be obtained.

Figure 5:
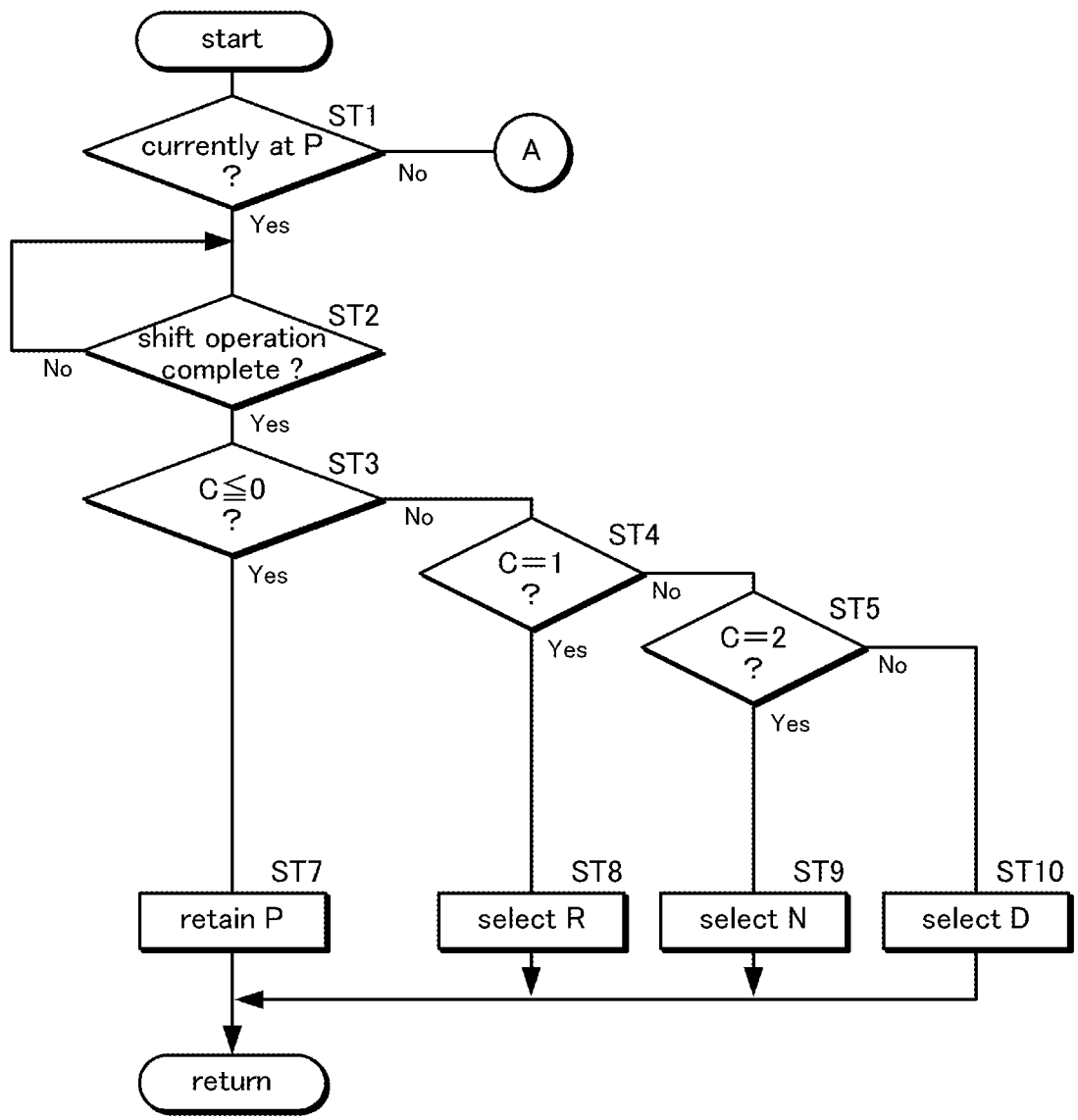
FIGS. 5 to 9 show a flowchart of the control flow in changing shift positions given as a first embodiment of the present invention.

FIGS. 5 to 9 show the control flow of a first embodiment of the present invention. FIG. 5 shows the control flow when the current shift position is at the P position. When the vehicle is initially started, the shift position is at the P position. It can be accomplished by using any known arrangement. During the operation of the vehicle, the vehicle operator may select the P position when the vehicle is stationary. When the P position is selected (ST1: Yes), a completion of a single shift operation is detected in step ST2. As discussed above, a single shift operation may be detected as a continuous angular movement of the shift knob 14 without a pause of more than a prescribed time period such as 0.2 seconds. During a single shift operation, the rotational direction of the shift knob 14 may be reversed. In such a case, the resulting angular movement is measured as the angular displacement between the initial shift position and the final shift position.

Upon detecting the completion of a single shift operation from the P position (ST2: Yes), it is determined if the count value C is equal to or smaller than zero (ST3). If not, it is determined if the count value C is equal to 1 (ST4). If not, it is determined if the count value C is equal to 2 (ST5). If not, it means that the count value C is equal to or greater 3.

If the count value C is equal to or smaller than zero in step ST3, the P position is maintained (ST7), and the program flow returns to the main flow. Therefore, when the shift knob 14 is not turned at all in effect or turned in clockwise direction by any angular displacement, the shift position remains at the P position.

If the count value C is equal to 1 in step ST4, the shift position is changed by one stage to the R position (ST8). If the count value C is equal to 2 in step ST5, the shift position is changed by two stages to the N position (ST9). If the count value C is equal to 3 (ST5: No), the shift position is changed by three stages to the D position, and the vehicle is brought ready to start off. In any of the cases, the program flow returns to the main flow.

If the count value C is greater than 3 (ST5: No), the change of the shift position from the P position is still limited to the D position. This is advantageous because the shift position is normally desired to be at the D position when starting off the vehicle, and it is annoying to the vehicle operator if the shift position is brought to the L position owing to the inadvertent excessive turning of the shift knob. Owing to this arrangement, when changing the shift position from the P position to the D position to start off the vehicle, the vehicle operator is allowed to turn the shift knob in counter-clockwise direction by large enough an angle without being required to stop the movement of the shift knob exactly at the D position.

Figure 10:
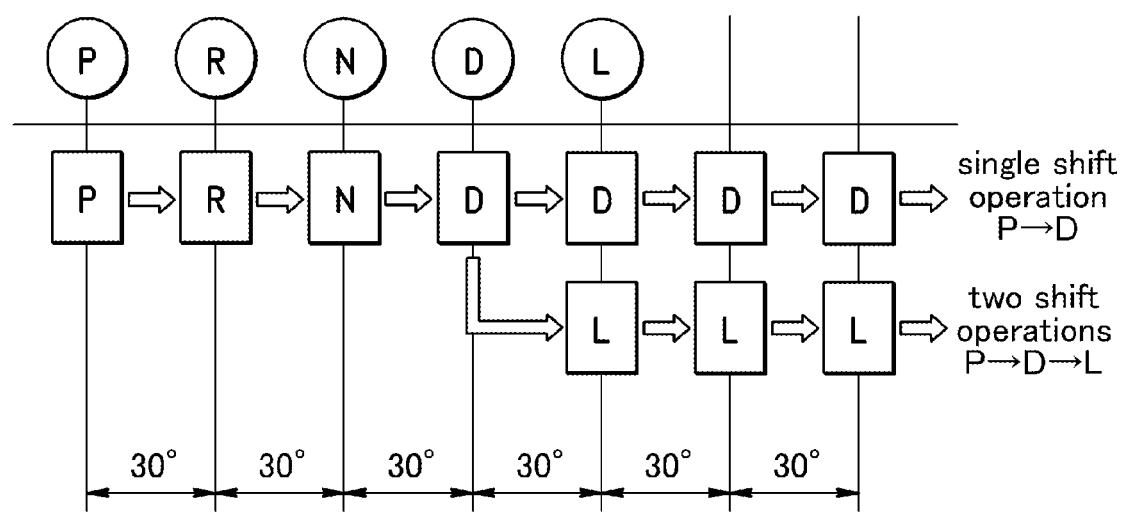
FIG. 10 is a diagram showing the mode of operation of a part of the first embodiment.

FIG. 10 illustrates this arrangement. When the shift knob 14 is turned from the P position, the shift position is changed according to the number of 30 degree increments of the rotation of the shift knob 14 up to the D position. However, when the shift knob 14 is turned beyond the three 30 degree increments of the rotation of the shift knob 14, the shift position is limited to the D position, and does not advance to the L position. When the shift operation is terminated at the D position, and a subsequent shift operation in counter-clockwise direction is performed following a pause of more than 0.2 seconds, the shift position is allowed to be changed to the L position, without regard to the number of the 30 degree increments beyond the L position.

Figure 6:
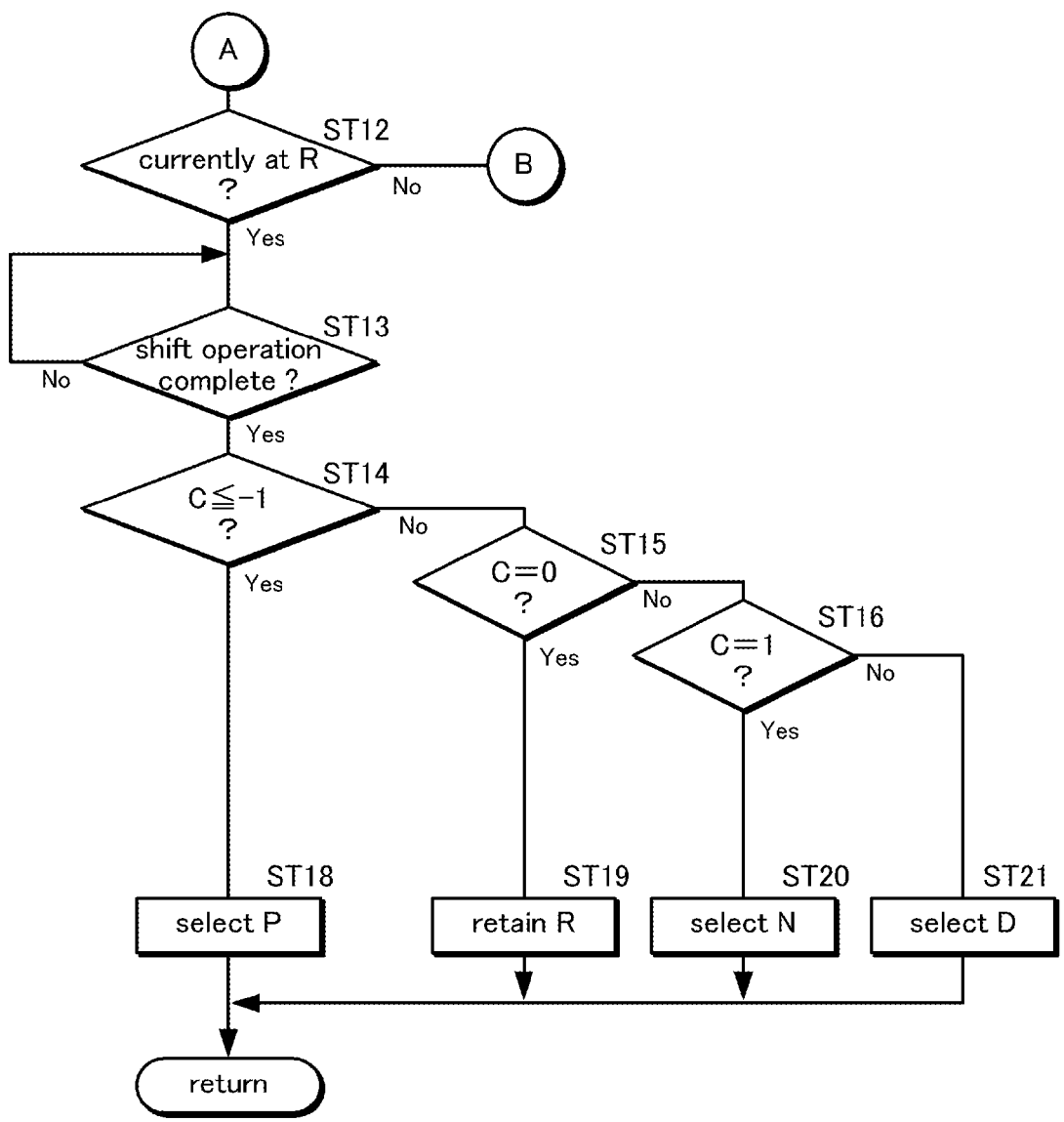

Referring to FIG. 6, upon detecting that the P position is not selected in step ST1 (FIG. 5), it is determined if the R position is selected in step ST 12. If the R position is detected (ST12: Yes), a completion of a single shift operation is detected in step ST13. Upon detecting the completion of a single shift operation from the R position, it is determined if the count value C is equal to or smaller than −1 (step ST14). If not, it is determined if the count value C is equal to 0 (step ST15). If not, it is determined if the count value C is equal to 1 (step ST16). If not (ST16: No), it means that the count value C is equal to or greater 2.

If the count value C is equal to or smaller than −1 in step ST14, the shift position is changed to the P position (ST18). A separate arrangement may be made to prohibit this change of the shift position when the vehicle is traveling at more than a prescribed speed. If the count value C is equal to 0 in step ST15, the R position is maintained (ST19). If the count value C is equal to 1 in step ST16, the shift position is changed to the N position (ST20). If the count value C is equal to 2 (ST16: No), the shift position is changed to the D position. If the count value C is greater than 2 (ST16: No), the change of the shift position from the R position in a single shift operation is still limited to the D position. In any of the cases, the program flow returns to the main flow.

Figure 7:
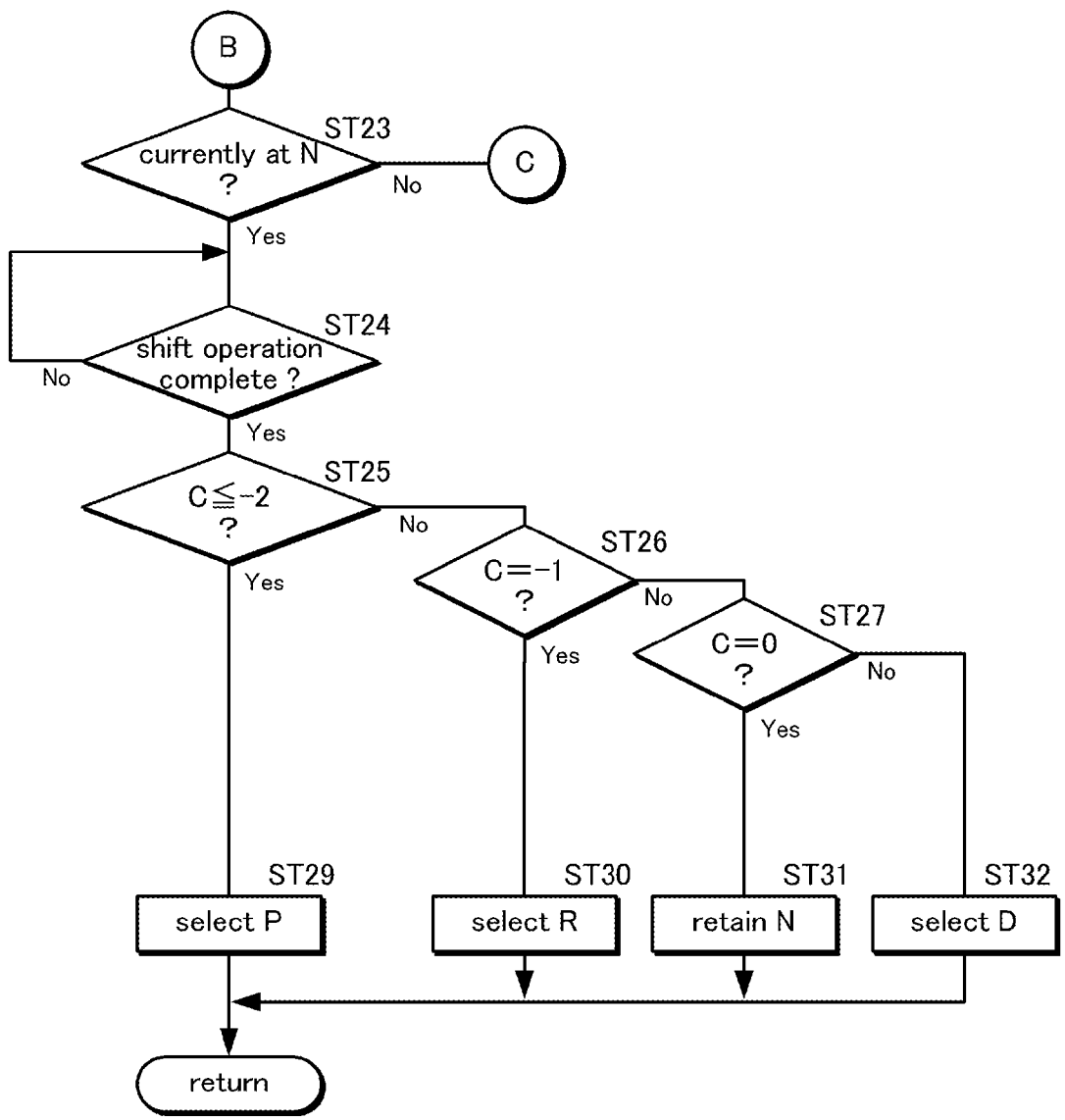

Referring to FIG. 7, upon detecting that the R position is not selected in step ST12 (FIG. 6), it is determined if the N position is selected in step ST 23. If the N position is detected (ST23: Yes), a completion of a single shift operation is detected in step ST24. Upon detecting the completion of a single shift operation from the N position, it is determined if the count value C is equal to or smaller than −2 (ST25). If not, it is determined if the count value C is equal to −1 (ST26). If not, it is determined if the count value C is equal to 0 (ST27). If not, it means that the count value C is equal to or greater than 1.

If the count value C is equal to or smaller than −2 in step ST25, the shift position is changed to the P position. A separate arrangement may be made to prohibit this change of the shift position if the vehicle is traveling at more than a prescribed speed. If the count value C is equal to −1 in step ST26, the shift position is changed to the R position (ST30). If the count value C is equal to 0 in step ST27, the N position is maintained (ST31). If the count value C is equal to 1 (ST27: No), the shift position is changed to the D position (ST32). Even if the count value C is greater than 1, the change of the shift position from the N position in a single shift operation is still limited to the D position. In any of the cases, the program flow returns to the main flow.

Figure 8:
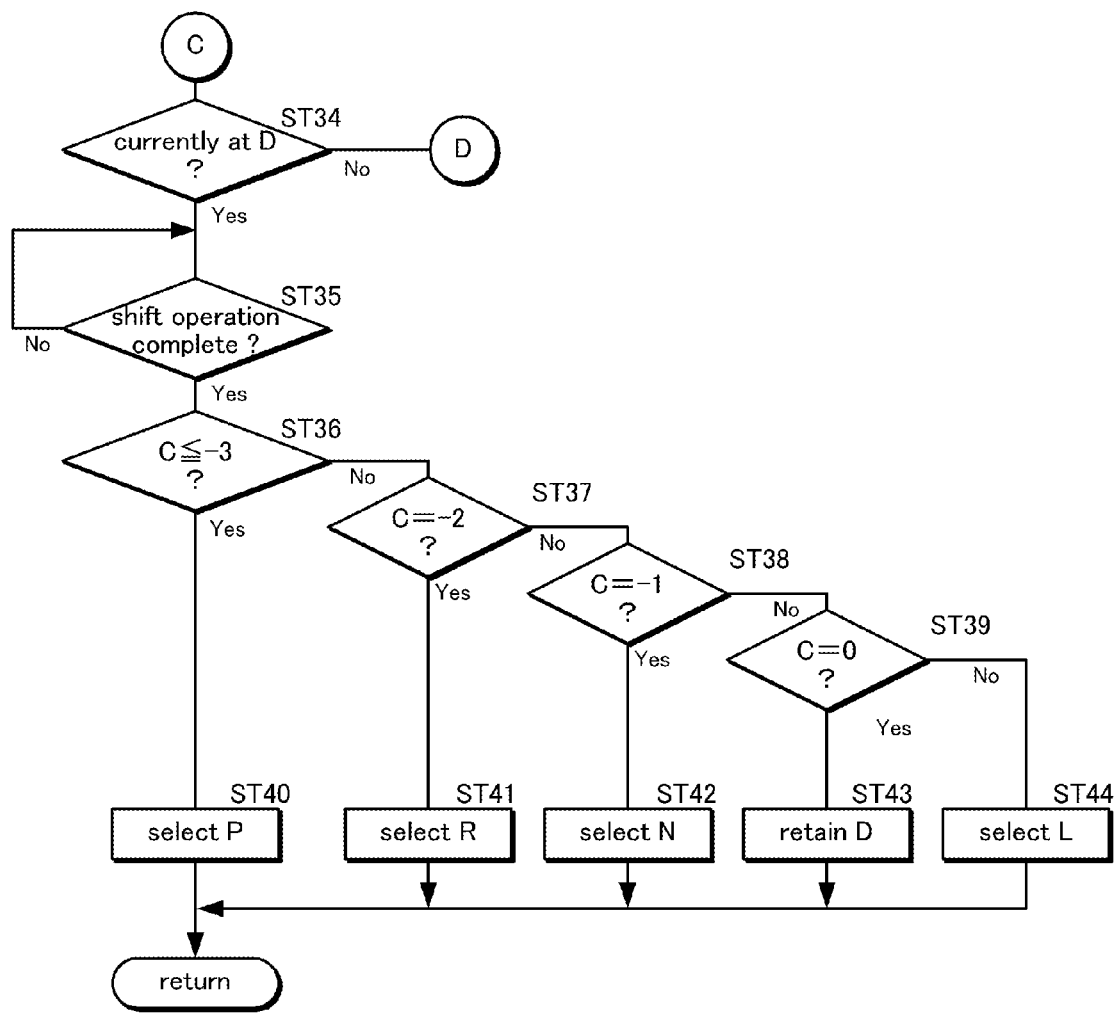

Referring to FIG. 8, upon detecting that the N position is not selected in step ST 23 (FIG. 7), it is determined if the D position is selected in step ST 34. Upon detecting the D position (ST34: Yes), a completion of a single shift operation is detected in step ST35.

Upon detecting the completion of a single shift operation from the D position (ST35: Yes), it is determined if the count value C is equal to or smaller than −3 in step ST36. If not, it is determined if the count value C is equal to −2 in step ST37. If not, it is determined if the count value C is equal to −1 in step ST38. If not, it is determined if the count value C is equal to 0 in step ST39. If not, it means that C is equal to or greater 1.

If the count value C is equal to or smaller than −3 in step ST36, the shift position is changed to the P position (ST40). A separate arrangement may be made to prohibit this change of the shift position if the vehicle is traveling at more than a prescribed speed. If the count value C is equal to −2 in step ST37, the shift position is changed to the R position (ST41). If the count value C is equal to −1 in step ST38, the shift position is changed to the N position (ST42). If the count value C is equal to 0 in step ST38, the D position is maintained (ST43). If the count value C is equal to or greater than 1 (ST39: No), the shift position is changed to the L position (ST44). In any of the cases, the program flow returns to the main flow.

Figure 9:
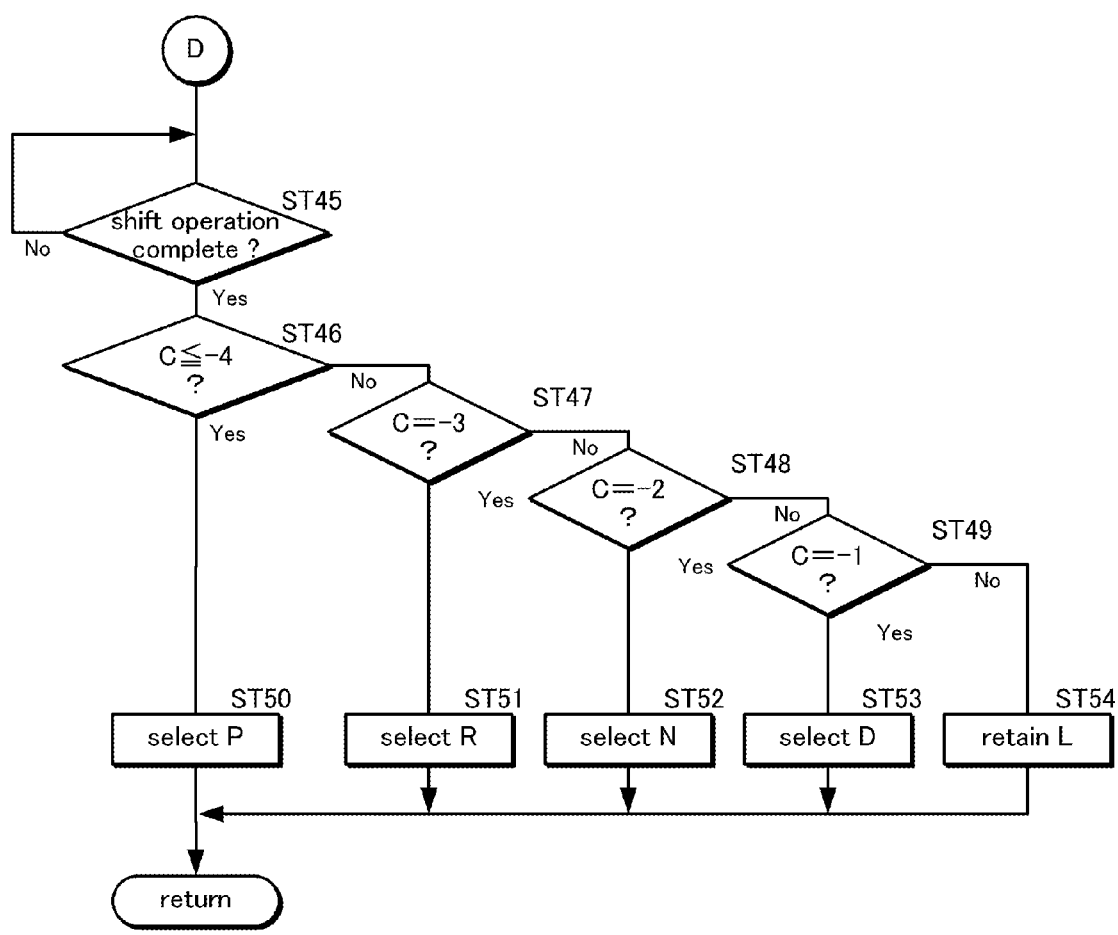

Referring to FIG. 9, upon failing to detect the D position in ST34 (FIG. 8), a completion of a single shift operation is detected in step ST45. Upon detecting the completion of a single shift operation from the L position in step ST45, it is determined if the count value C is equal to or smaller than −4 in step ST46. If not, it is determined if the count value C is equal to −3 in step ST47. If not, it is determined if the count value C is equal to −2 in step ST48. If not, it is determined if the count value C is equal to −1 in step ST49. If not, it means that the count value C is equal to or greater than 0.

If the count value C is equal to or smaller than −4 in step ST46, the shift position is changed to the P position (ST50). A separate arrangement may be made to prohibit this change of the shift position if the vehicle is traveling at more than a prescribed speed. If the count value C is equal to −3 in step 47, the shift position is changed to the R position (ST51). If the count value C is equal to −2 in step 48, the shift position is changed to the N position (ST52). If the count value C is equal to −1 in step 49, the shift position is changed to the D position (ST53). If the count value C is equal to or greater than 0 (ST49: No), the L position is maintained (ST54). In any of the cases, the program flow returns to the main flow.

Figure 11:
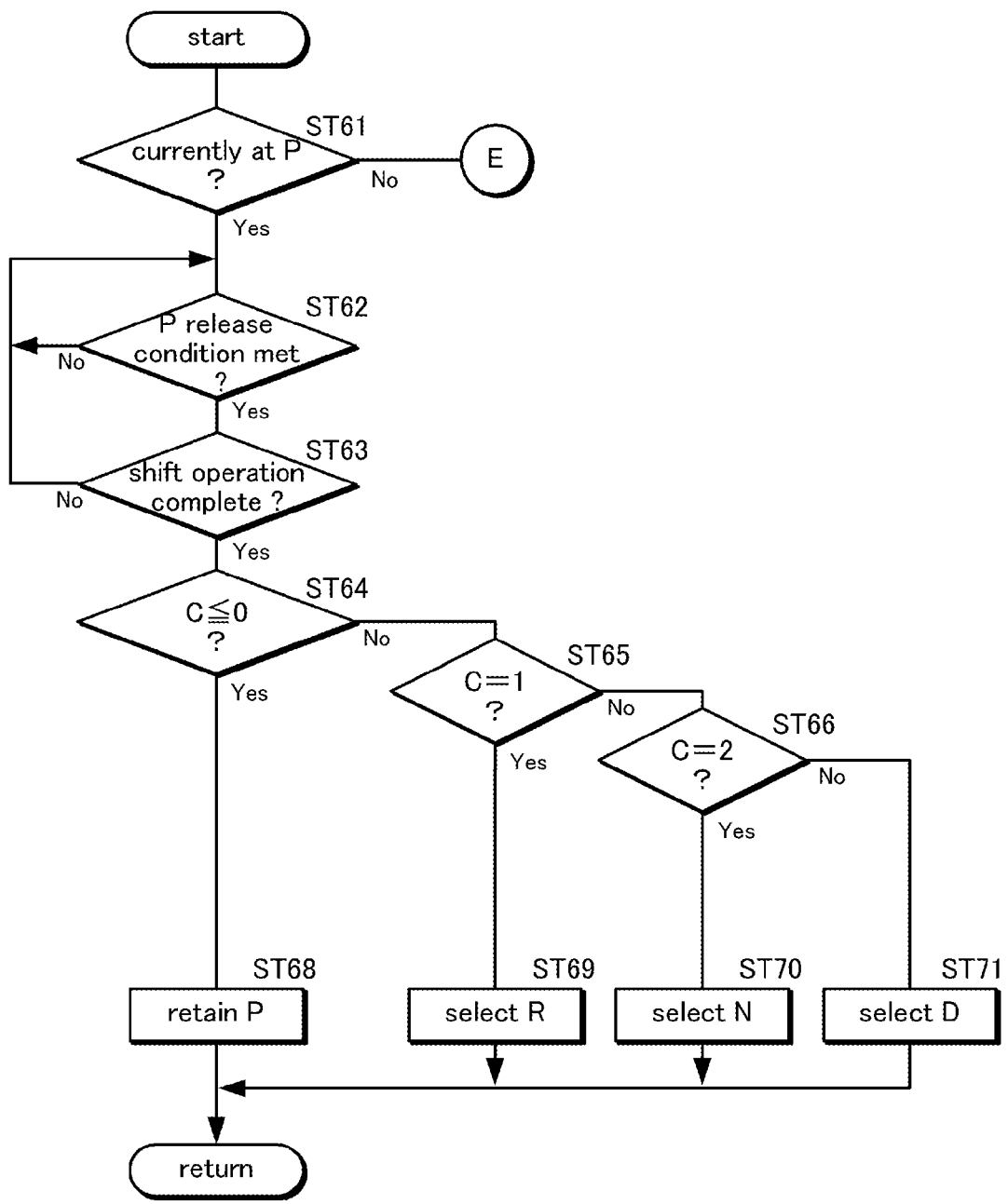
FIGS. 11 to 15 show a flowchart of the control flow in changing shift positions given as a second embodiment of the present invention.

FIGS. 11 to 15 show the control flow of a second embodiment of the present invention. This embodiment differs from the first embodiment mainly in that the change in the shift position is limited also depending on the vehicle speed. More specifically, an improper change in the shift position due to vehicle speed constraints can be avoided by using a simple structure. When the vehicle is initially started, the shift position is at the P position on account of a per se known interlock system provided in the vehicle. Also, during the operation of the vehicle, the vehicle operator may intentionally select the P position when the vehicle is stationary. Referring to FIG. 11, upon detecting the P position (ST61: Yes), it is determined if a prescribed condition for allowing the shift position to be moved from the P position is met in step ST62. The prescribed condition may include that the brake pedal 22 is depressed, the accelerator pedal 17 is released and/the engine is in operation. If this condition is not met (ST62: No), the shift knob 14 may be turned in either direction, but it does not cause the shift position to be moved from the P position.

If this condition is met (ST62: Yes), a completion of a single shift operation is detected in step ST63. As discussed above, a single shift operation may be detected as a continuous angular movement of the shift knob 14 without a pause of more than a prescribed time period such as 0.2 seconds. During a single shift operation, the rotational direction of the shift knob 14 may be reversed. In such a case, the resulting angular movement is measured as the angular displacement between the initial shift position and the final shift position.

Upon detecting the completion of a single shift operation from the P position in step ST63, it is determined if the count value C is equal to or smaller than zero in step ST64. If not, it is determined if the count value C is equal to 1 in step ST65. If not, it is determined if the count value C is equal to 2 in step ST66. If not, it means that the count value C is equal to or greater 3.

If the count value C is equal to or smaller than zero in step 64, the P position is maintained (ST68), and the program flow returns to the main flow. Therefore, when the shift knob 14 is turned in clockwise direction by any angular displacement, the shift position remains at the P position.

If the count value C is equal to 1 in step ST65, the shift position is changed by one stage to the R position (ST69). If the count value C is equal to 2 in step ST66, the shift position is changed by two stages to the N position (ST70). If the count value C is equal to or greater than 3 (ST66: No), the shift position is changed by three stages to the D position, and the vehicle is brought ready to start off. Again, no matter how far more the shift knob 14 is turned beyond this position, the D position is still selected as illustrated in FIG. 10. This is advantageous because the shift position is desired to be at the D position when starting off the vehicle, and it is annoying to the vehicle operator if the shift position is brought to the L position owing to the inadvertent excessive turning of the shift knob. Owing to this arrangement, when changing the shift position from the P position to the D position to start off the vehicle, the vehicle operator is allowed to turn the shift knob in counter-clockwise direction by large enough an angle without being required to stop the movement of the shift knob exactly at the D position. In any of the cases, the program flow returns to the main flow.

Figure 12:
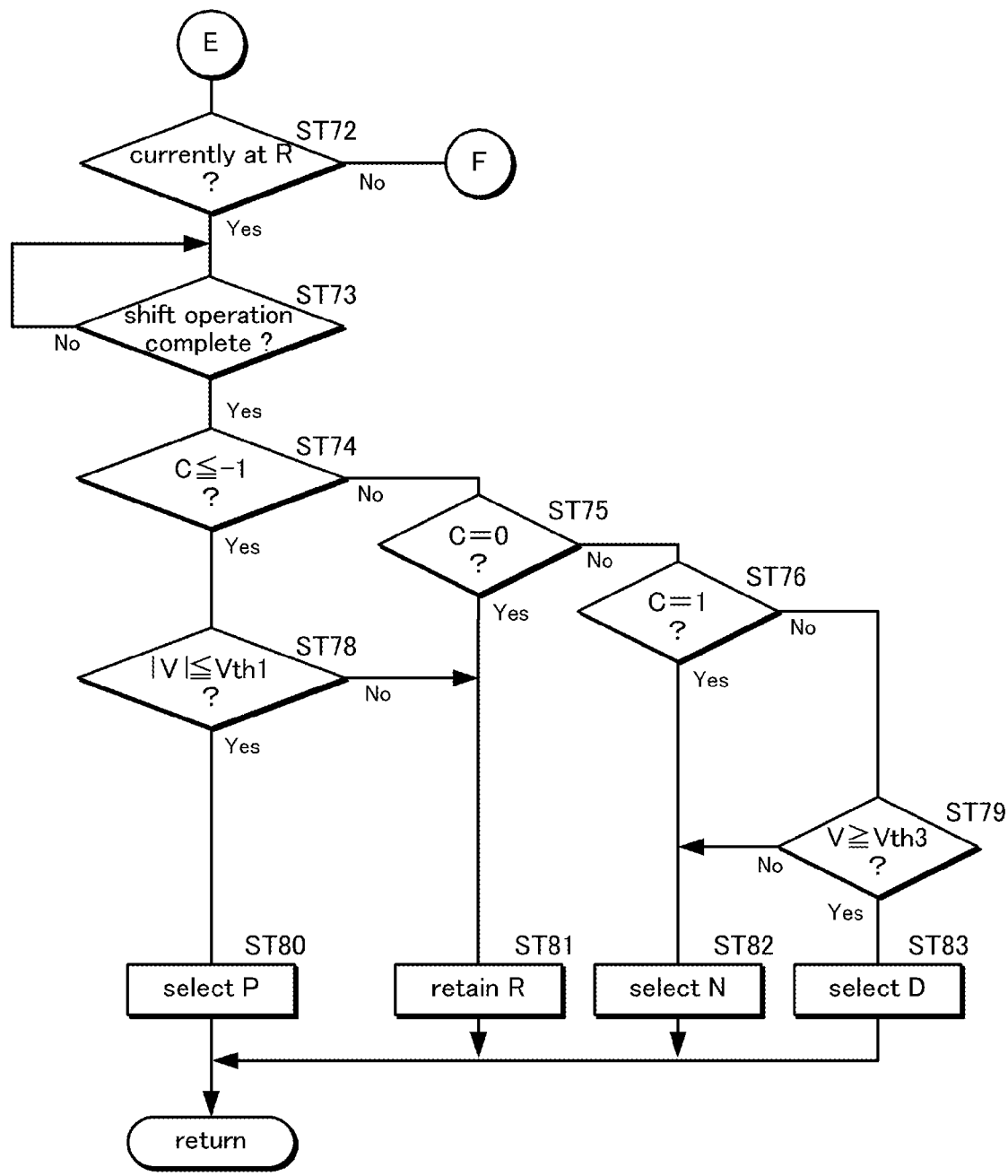

Referring to FIG. 12, if it is determined that the P position is not selected in step ST61 (FIG. 11), it is determined if the R position is selected in step ST72. Upon detecting the R position (ST72: Yes), a completion of a single shift operation is detected in step ST73. Upon detecting the completion of a single shift operation from the R position in step ST73, it is determined if the count value C is equal to or smaller than –1 in step ST74. If not, it is determined if the count value C is equal to 0 in step ST75. If not, it is determined if the count value C is equal to 1 in step ST76. If not, it means that the count value C is equal to or greater 2.

If the count value C is equal to or smaller than –1 in step ST74, it is determined if the absolute value of the vehicle speed V is equal to or lower than a first threshold value Vth1 (5 km/h, for instance) in step ST78. If the absolute value of the vehicle speed V is equal to or lower than the first threshold value Vth1 (ST78: Yes), the shift position is allowed to be changed from the R position to the P position (ST80). If the absolute value of the vehicle speed V is greater than the first threshold value Vth1 (ST78: No), the shift position is prevented from being changed from the R position or maintained at the R position (ST81). Therefore, the change of the shift position from the R position to the P position is permitted only when the vehicle is substantially stationary. In other words, if the vehicle is traveling at some speed in the R position, the clockwise rotation of the shift knob is disregarded, and the R position is maintained. However, when the vehicle is stationary, the clockwise rotation of the shift knob causes the shift position to be changed from the R position to the P position. This is illustrated on the left hand side of FIG. 16.

If the count value C is equal to 0 in step ST75, the R position is maintained (ST81). If the count value C is equal to 1 in step ST76, the shift position is changed to the N position (ST82). If the count value C is equal to or greater than 2 (ST76: No), it is determined if the vehicle speed is higher than a third threshold value Vth3 (which is negative in value, and greater in absolute value than the first threshold value Vth1; for instance –10 km/h). If the vehicle is not traveling rearward at a relatively high speed (if the vehicle is traveling rearward at a low speed or traveling forward) (ST79: Yes), the shift position is allowed to be changed from the R to the D position (ST83). If the vehicle is traveling rearward at a high speed (ST79: No), the change of the shift position is limited to the N position (ST82). Therefore, when the vehicle is traveling rearward at a high speed, the change of the shift position from the R position to the D position is prohibited.

Figure 16:
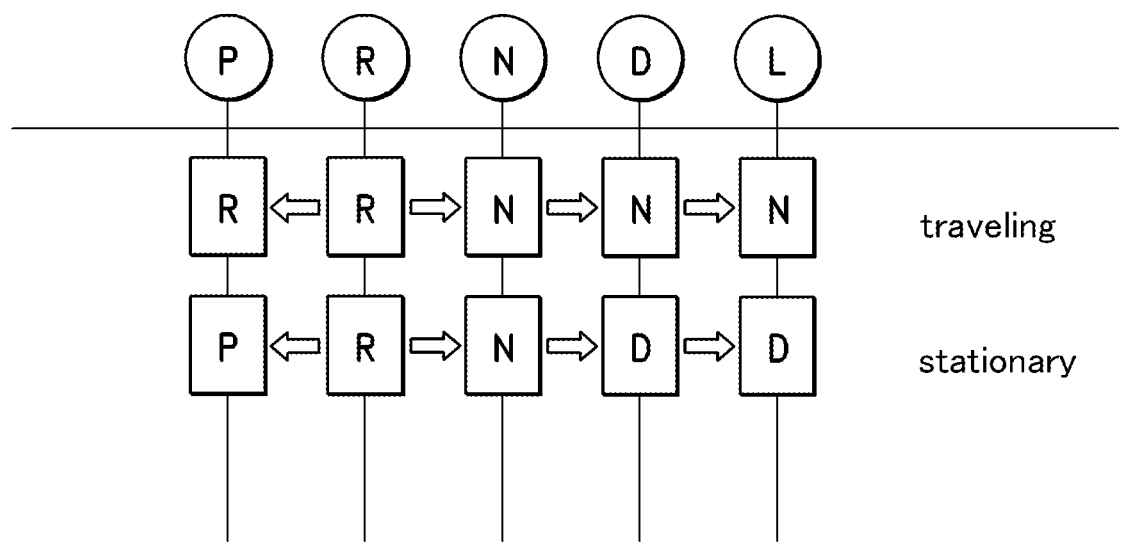
FIG. 16 is a diagram showing the mode of operation of a part of the second embodiment.

This is illustrated on the right hand side of FIG. 16. If the vehicle is traveling at some speed in the R position, the counter-clockwise rotation of the shift knob allows the shift position to be changed only to the N position. If the vehicle is stationary, the counter-clockwise rotation of the shift knob allows the shift position to be changed only to the D position. In any of the cases, upon finalizing the shift change, the program flow returns to the main flow.

Figure 13:
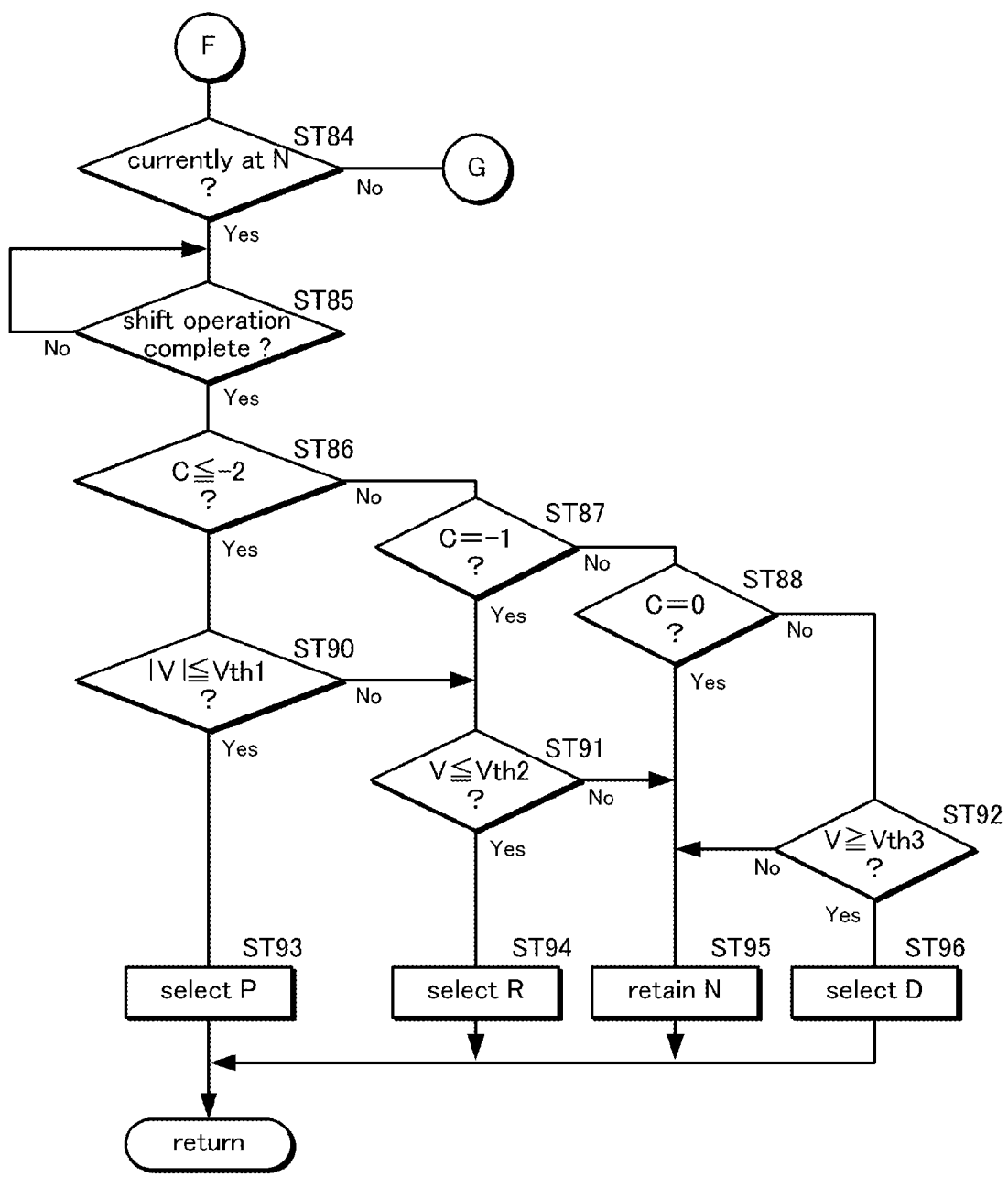

Referring to FIG. 13, if it is determined that the R position is not selected in step ST72 (FIG. 12), it is determined if the N position is selected in step ST84. Upon detecting the N position (ST84: Yes), a completion of a single shift operation is detected in step ST85. Upon detecting the completion of a single shift operation from the N position in step ST85, it is determined if the count value C is equal to or smaller than –2 in step ST86. If not, it is determined if the count value C is equal to –1 in step ST87. If not, it is determined if the count value C is equal to 0 in step DST88. If not, it means that the count value C is equal to or greater 1.

If the count value C is equal to or smaller than –2 in step ST86, it is determined if the absolute value of the vehicle speed V is equal to or lower than a first threshold value Vth1 (5 km/h, for instance) in step ST90. If the absolute value of the vehicle speed V is equal to or lower than the first threshold value Vth1 (ST90: Yes), the shift position is allowed to be changed from the N position to the P position (ST93). If the absolute value of the vehicle speed V is greater than the first threshold value Vth1 (ST90: No), the program flow advances to step ST91 where the vehicle speed V is compared with a second threshold value Vth2 which is positive in value and greater in absolute value than the first threshold value Vth1, and may be 10 km/h, for instance.

If the vehicle speed V is equal to or lower than the second threshold value Vth2 in step ST91, the shift position is changed to the R position (ST94). If the vehicle speed V is higher than the second threshold value Vth2 in step ST91, the shift position is maintained at the N position (ST95).

In other words, when the vehicle speed is very small (Vth1≥|V|), be it forward or rearward, the shift position can be changed from the N position to the P position (by two stages). If the vehicle speed is relatively small (Vth2≥|V|>Vth1) or the vehicle is traveling rearward (–Vth1>V), the shift position can be changed from the N position only to the R position no matter how far more the shift knob 14 is turned in the clockwise direction. When the vehicle speed V is relatively high (V>Vth2), the shift position is maintained at the N position how far more the shift knob 14 is turned in the clockwise direction.

If the count value C is equal to −1 in step ST87, the vehicle speed V is compared with the second threshold value Vth2 in step ST91. Again, if the vehicle speed V is equal to or lower than the second threshold value Vth2 in step ST91, the shift position is changed to the R position (ST94). If the vehicle speed V is higher than the second threshold value Vth2 in step ST91, the shift position is maintained at the N position (ST95).

If the count value C is equal to 0 in step ST88, the shift position is maintained at the N position. If the count value C is equal to greater than 1 (ST88: No), the vehicle speed is compared with the third threshold value Vth3. If the vehicle is not traveling rearward at a relatively high speed (if the vehicle is traveling rearward at a low speed or traveling forward) (ST92: Yes), the shift position is allowed to be changed from the N position to the D position (ST96). If the vehicle is traveling rearward at a high speed (ST92: No), the shift position is maintained at the N position (ST95). Therefore, when the vehicle is traveling rearward at a high speed, the change of the shift position from the N position to the D position is prohibited.

In any of the cases, upon finalizing the shift change, the program flow returns to the main flow.

Figure 14:
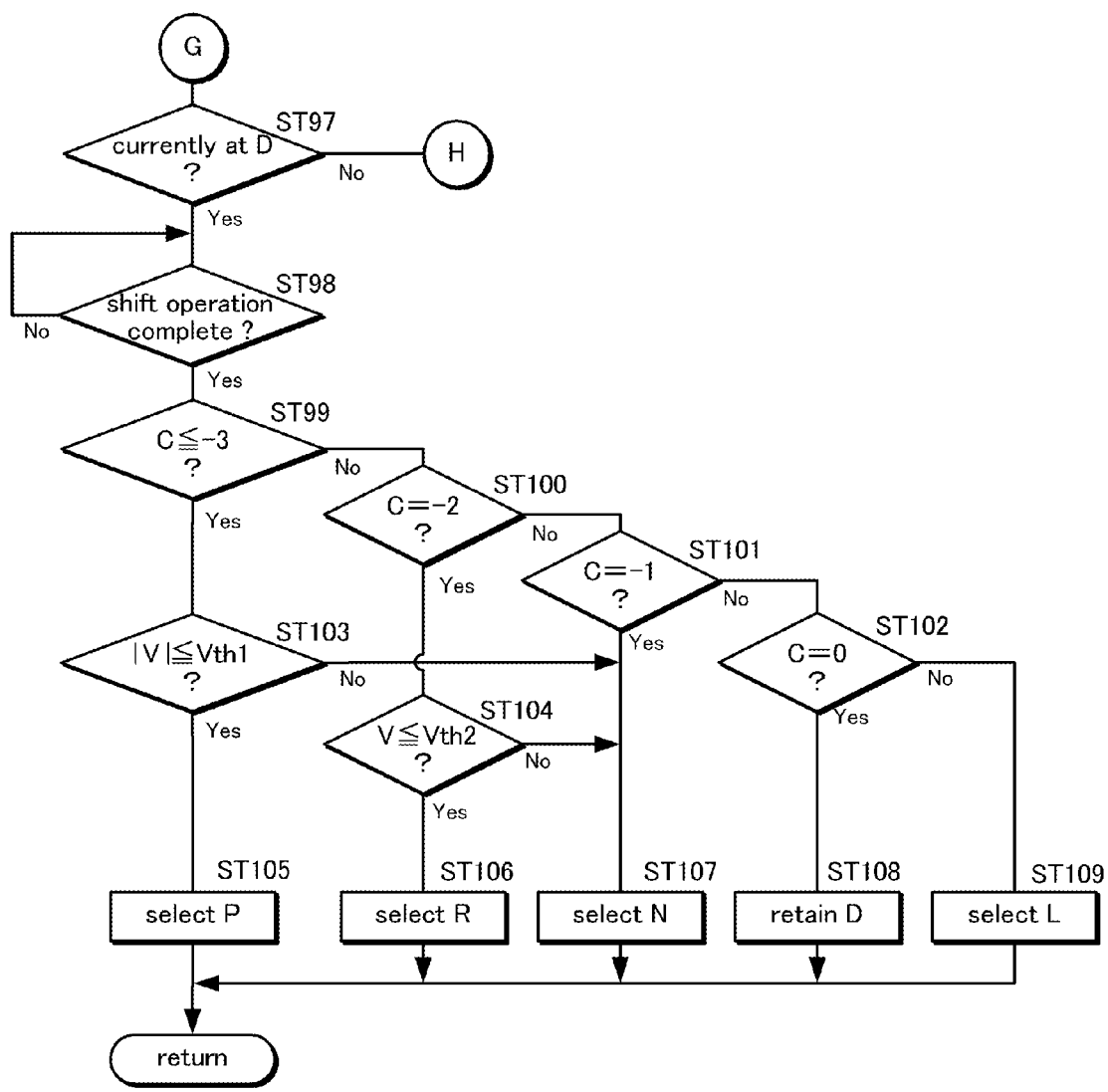

Referring to FIG. 14, if it is determined that the N position is not selected in step ST84 (FIG. 13), it is determined if the D position is selected in step ST97. Upon detecting the D position (ST97: Yes), a completion of a single shift operation is detected in step ST98.

Upon detecting the completion of a single shift operation from the D position (ST98: Yes), it is determined if the count value C is equal to or smaller than −3 in step ST99. If not, it is determined if the count value C is equal to −2 in step ST100. If not, it is determined if the count value C is equal to −1 in step ST101. If not, it is determined if the count value C is equal to 0 in step ST102. If not, it means that the count value is equal to or greater than 1.

If the count value C is equal to or smaller than −3 in step ST99, the absolute value of the vehicle speed V is compared with the first threshold value Vth1 in step ST103. If the absolute value of the vehicle speed V is equal to or lower than the first threshold value Vth1 (ST103: Yes), the shift position is allowed to be changed from the D position to the P position (ST105). If the absolute value of the vehicle speed V is greater than the first threshold value Vth1 (ST103: No), the change of the shift position from the D position is limited to the N position (ST107).

Figure 17:
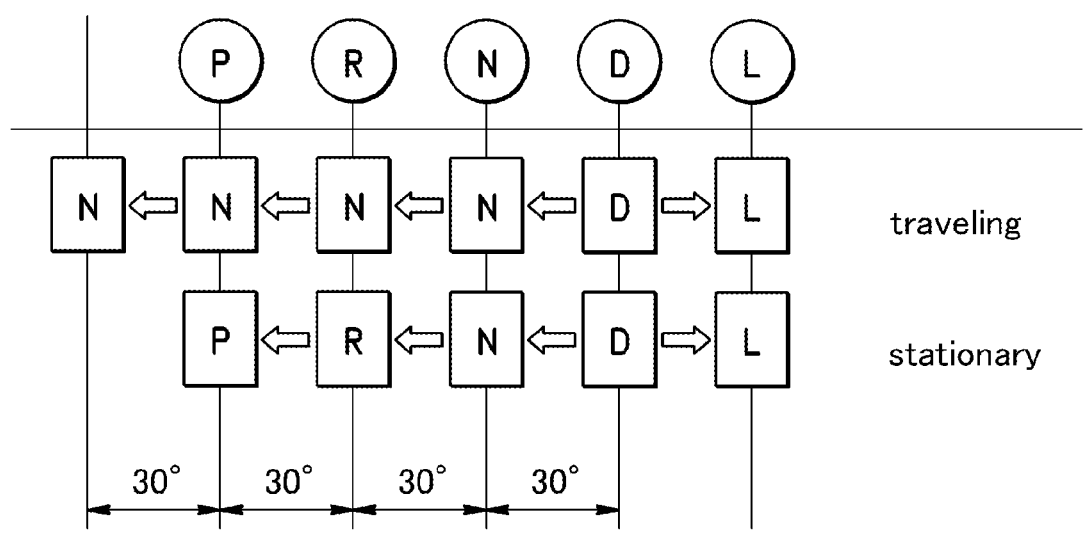
FIG. 17 is a diagram showing the operation of another part of the second embodiment.

If the count value C is equal to −2 in step ST100, the vehicle speed V is compared with the second threshold value Vth2. If the vehicle speed is equal to or lower than the second threshold value Vth2 in step ST104, the shift position is allowed to be changed from the D position to the R position (ST106). If the vehicle speed V is higher than the second threshold value Vth2 in step ST104, the change of the shift position from the D position is limited to the N position (ST107). On the other hand, when the vehicle is stationary, the shift position can be changed from the D position to either the P position or the R position at will. This is illustrated on the left hand side of FIG. 17.

If the count value C is equal to −1 in step ST101, the shift position is changed from the D position to the N position (ST108). If the count value C is equal to 0, the D position is maintained. If the count value C is equal to or greater than 1 (ST102: No), the shift position is changed from the D position to the L position. In any of the cases, upon finalizing the change in the shift position, the program flow returns to the main flow.

Figure 15:
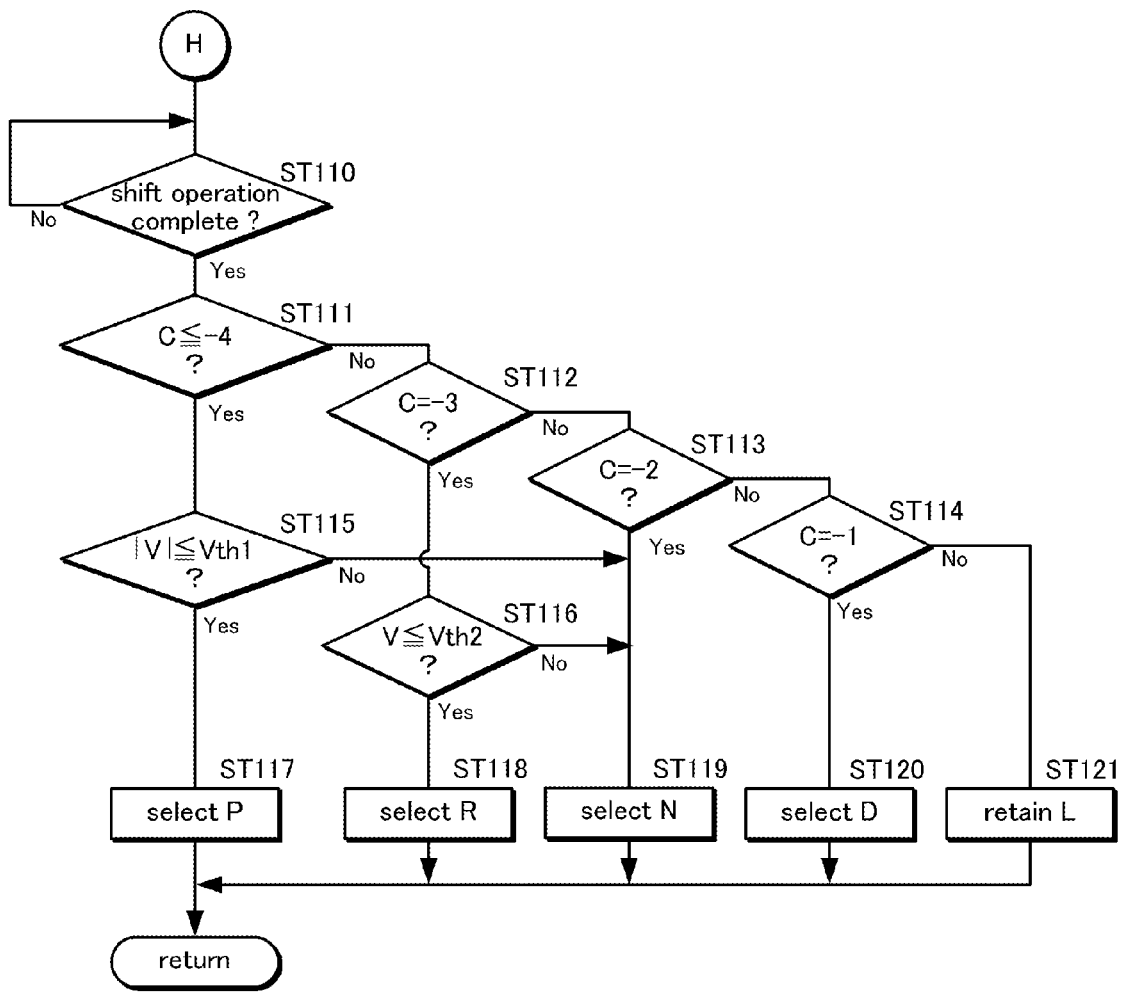

Referring to FIG. 15, if it is determined that the D position is not selected in step ST97 (FIG. 14), it means that the L position is selected. Upon detecting the L position (ST97: No), a completion of a single shift operation is detected in step ST110.

Upon detecting the completion of a single shift operation from the L position (ST110: Yes), it is determined if the count value C is equal to or smaller than −4 in step ST111. If not, it is determined if the count value C is equal to −3 in step ST112. If not, it is determined if the count value C is equal to −2 in step ST113. If not, it is determined if the count value C is equal to −1 in step ST114. If not, it means that the count value is equal to or greater than 0.

If the count value C is equal to or smaller than −4 in step ST111, the absolute value of the vehicle speed V is compared with the first threshold value Vth1 in step ST115. If the absolute value of the vehicle speed V is equal to or lower than the first threshold value Vth1 (ST115: Yes), the shift position is allowed to be changed from the L position to the P position (ST117). If the absolute value of the vehicle speed V is greater than the first threshold value Vth1 (ST115: No), the change of the shift position from the L position is limited to the N position (ST119).

If the count value C is equal to −3 in step ST112, the vehicle speed V is compared with the second threshold value Vth2. If the vehicle speed is equal to or lower than the Vth2 in step ST116, the shift position is allowed to be changed from the L position to the R position (ST118). If the vehicle speed V is higher than the Vth2 in step ST116, the change of the shift position from the L position is limited to the N position (ST119).

If the count value C is equal to −2 in step ST113, the shift position is changed from the L position to the N position (ST119). If the count value C is equal to −1 in step ST114, the shift position is changed from the L position to the D position (ST120). If the count value C is equal to or greater than 0 (ST114: No), the L position is maintained (ST121). In any of the cases, upon finalizing the change in the shift position, the program flow returns to the main flow.

Figure 18:
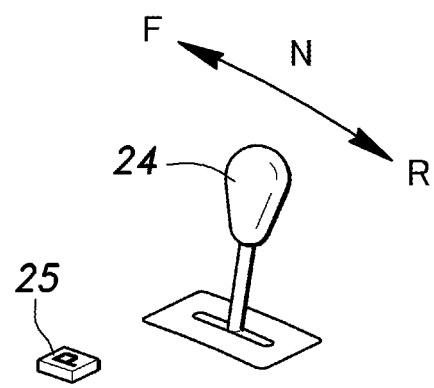
FIG. 18 is a simplified view showing an alternate embodiment of the shift member.

In the foregoing embodiments, the shift member consisted of a shift knob that can be rotated in either direction in an endless manner, and the shift position is normally advanced in a stepwise manner for each prescribed angular displacement of the shift knob 14 such as 30 degrees. However, as shown in FIG. 18, the shift member may also consist of a joystick or a momentary switch type shift member 27 that can be moved or tilted in either direction from a neutral (N) position in both forward (F) and rearward (R) directions and configured to be returned to the neutral position when released by using a spring member or the like, and a movement detector associated with the shift member 27 is configured to detect the movement of the shift member according to a time duration of the displacement of the shift member from the neutral direction in each given direction. In such a case, a parking position may be achieved by pressing a switch 25 provided next to the shift member 24. Alternatively, the movement detector may detect the movement of the shift member according to a number of prescribed displacements of the shift member from the neutral direction in each given direction.

The control processes of the first and second embodiments are applicable to these modified embodiments possibly with minor modifications.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A speed shift device for a transmission of a motor vehicle, comprising:
   a shift member that can be manually advanced selectively in a first direction and a second direction in an endless manner;
   a movement detector that detects a movement of the shift member;
   a control unit for selecting a shift position of the transmission from a plurality of shift positions in a prescribed order according to a detection signal of the movement detector; and
   an indicator that indicates the selected shift position;
   wherein the control unit is configured to cause the selected shift position to be changed in the prescribed order in correspondence to a displacement of the shift member in each single shifting operation under normal condition, and to limit the selected shift position to be changed beyond a prescribed shift position depending on an initial shift position and an amount of the movement of the shift member in a single shifting operation, and
   wherein the shift positions include a non-forward travel position, a D (drive) position for a normal forward travel and an additional forward travel position for a special purpose arranged in that order in the first direction, and the control unit is configured to limit the change in the shift position from the non-forward travel position in a single shifting operation in the first direction to the D position without regard to the displacement of the shift member.

2. The speed shift device according to claim 1, wherein the shift member comprises a shift knob that can be rotated in either direction in an endless manner.

3. The speed shift device according to claim 2, wherein the shift member further comprises a detent mechanism that retains the shift knob resiliently at each of the shift positions.

4. The speed shift device according to claim 1, wherein a single shifting operation is determined as a continuous movement of the shift member that does not include a pause of more than a prescribed time period.

5. The speed shift device according to claim 1, wherein the shift member is configured to be moveable in either direction from a neutral position and configured to be returned to the neutral position when released, and the movement detector is configured to detect the movement of the shift member according to a time duration of the displacement of the shift member from the neutral direction in each given direction.

6. The speed shift device according to claim 1, wherein the shift member comprises a shift knob that can be moved in either direction from a neutral position and is configured to be returned to the neutral position when released, and the movement detector detects the movement of the shift member according to a number of prescribed displacements of the shift member from the neutral direction in each given direction.

7. The speed shift device according to claim 1, wherein the non-forward travel position comprises at least one of a P (park) position, a R (reverse) position and a N (neutral) position.

8. The speed shift device according to claim 1, wherein the non-forward travel position comprises a P (park) position, and the control unit is configured to prevent the change in the shift position from the P position in a single shifting operation in the second direction without regard to the displacement of the shift member in the second direction.

9. The speed shift device according to claim 1, wherein the control unit is configured to limit the selected shift positions to be changed beyond a prescribed shift position additionally depending on a state of a brake of the vehicle.

10. The speed shift device according to claim 9, wherein the non-forward travel position includes a P (park) position, and the control unit is configured to limit the change in the shift position from the P position in the first direction without regard to the displacement of the shift member unless a brake is applied.

11. The speed shift device according to claim 1, wherein the control unit is configured to limit the selected shift position to be changed beyond a prescribed shift position additionally depending on a traveling speed of the vehicle.

12. The speed shift device according to claim 1, wherein the non-forward travel position includes a P (park) position, a R (reverse) position and a N (neutral) position arranged in that order in the first direction.

13. The speed shift device according to claim 12, wherein the control unit is configured to prevent the change in the shift position from the R position in a single shifting operation by an advancing of the shift member by one or more stages in the second direction when the vehicle is traveling at more than a prescribed speed in either direction (Vth1).

14. The speed shift device according to claim 12, wherein the control unit is configured to limit the change in the shift position from the R position to the N position in a single shifting operation by an advancing of the shift member by two or more stages in the first direction when the vehicle is traveling rearward at more than a prescribed speed (Vth3).

15. The speed shift device according to claim 12, wherein the control unit is configured to limit the change in the shift position from the N position to the R position in a single shifting operation by an advancing of the shift member by two or more stages in the second direction when the vehicle is traveling at more than a first prescribed speed (Vth1) in either direction but not more than a second prescribed speed (Vth2) greater in value than the first prescribed speed.

16. The speed shift device according to claim 12, wherein the control unit is configured to prevent the change in the shift position from the N position in a single shifting operation by an advancing of the shift member by one stage in the second direction when the vehicle is traveling forward at more than a prescribed speed (Vth2).

17. The speed shift device according to claim 12, wherein the control unit is configured to prevent the change in the shift position from the N position in a single shifting operation by an advancing of one or more stages in the first direction when the vehicle is traveling rearward at more than a prescribed speed (Vth3).

18. The speed shift device according to claim 12, wherein the control unit is configured to limit the change in the shift position from the D position to the N position in a single shifting operation by an advancing of the shift member by two stages in the second direction when the vehicle is traveling forward at more than a prescribed speed (Vth2).

19. The speed shift device according to claim 12, wherein the control unit is configured to limit the change in the shift position from the D position to the N position in a single shifting operation by an advancing of the shift member by three or more stages in the second direction when the vehicle is traveling at more than a prescribed speed (Vth1) in either direction.

* * * * *